United States Patent
McGushion et al.

(10) Patent No.: US 9,794,369 B2
(45) Date of Patent: Oct. 17, 2017

(54) ACTIVE WEB PAGE CONSOLIDATOR

(71) Applicant: Kevin D. McGushion, Simi Valley, CA (US)

(72) Inventors: Kevin D. McGushion, Semi Valley, CA (US); Christopher Mark Brahmer, Camarillo, CA (US); Pavel Kovalev, Ventura, CA (US); Hunter McGushion, Simi Valley, CA (US)

( * ) Notice: Subject to any disclaimer, the term of this patent is extended or adjusted under 35 U.S.C. 154(b) by 42 days.

(21) Appl. No.: 14/407,031

(22) PCT Filed: Jun. 10, 2013

(86) PCT No.: PCT/US2013/045046
§ 371 (c)(1),
(2) Date: Dec. 10, 2014

(87) PCT Pub. No.: WO2013/188317
PCT Pub. Date: Dec. 19, 2013

(65) Prior Publication Data
US 2015/0142920 A1  May 21, 2015

Related U.S. Application Data

(60) Provisional application No. 61/657,882, filed on Jun. 10, 2012.

(51) Int. Cl.
*G06F 15/16* (2006.01)
*H04L 29/08* (2006.01)
*G06F 17/30* (2006.01)

(52) U.S. Cl.
CPC ........ *H04L 67/32* (2013.01); *G06F 17/30867* (2013.01); *H04L 67/06* (2013.01)

(58) Field of Classification Search
CPC .... H04L 67/32; H04L 67/06; G06F 17/30867
(Continued)

(56) References Cited

U.S. PATENT DOCUMENTS 7,085,997 B1 * 8/2006 Wu .................. G06F 17/30884
707/E17.114
7,240,045 B1   7/2007 Bushee
(Continued)

FOREIGN PATENT DOCUMENTS

JP   2000-036054 A   2/2000
JP   2011-239075 A   11/2011
(Continued)

OTHER PUBLICATIONS

International Search Report and Written Opinion for Int. App. No. PCT/US2014/010933; dated Jun. 24, 2014.
(Continued)

*Primary Examiner* — Tauqir Hussain
(74) *Attorney, Agent, or Firm* — Aaron P. McGushion

(57) ABSTRACT

A method for allowing a user to select any portion or all of one or more webpages for display at a user accessible interface screen and a system for updating the selected portions so that the user is kept up-to-date on changes taking place on the selected webpage URL's without navigating to them. This method of allowing user selected webpage aggregation onto one or more user accessible pages gives the user the ability to read and overview a multitude of information sources quickly at one location.

5 Claims, 14 Drawing Sheets

(58) Field of Classification Search
USPC .......................................................... 709/219
See application file for complete search history.

(56) References Cited

U.S. PATENT DOCUMENTS

| | | | |
|---|---|---|---|
| 7,809,599 | B2 | 10/2010 | Andrew |
| 2002/0015042 | A1 | 2/2002 | Robotham |
| 2002/0032701 | A1* | 3/2002 | Gao .................. G06F 17/30902 715/240 |
| 2002/0062396 | A1 | 5/2002 | Kakei |
| 2003/0023640 | A1 | 1/2003 | Challenger |
| 2003/0041106 | A1 | 2/2003 | Tuli |
| 2004/0230889 | A1 | 11/2004 | Ishiyama |
| 2006/0230100 | A1 | 10/2006 | Shin |
| 2007/0097431 | A1 | 5/2007 | Matsuda |
| 2007/0206221 | A1 | 9/2007 | Wyler |
| 2008/0018658 | A1 | 1/2008 | Bruno |
| 2008/0071929 | A1 | 3/2008 | Motte et al. |
| 2008/0163128 | A1 | 7/2008 | Callanan |
| 2008/0172399 | A1 | 7/2008 | Chi |
| 2008/0222273 | A1 | 9/2008 | Lakshmanan |
| 2009/0048902 | A1 | 2/2009 | Lynn |
| 2009/0144158 | A1 | 6/2009 | Matzelle |
| 2010/0161787 | A1 | 6/2010 | Jones |
| 2011/0004651 | A1 | 1/2011 | Tuli |
| 2011/0016403 | A1 | 1/2011 | Shibukawa |
| 2011/0043652 | A1* | 2/2011 | King .................. G06F 17/2211 348/222.1 |
| 2011/0167361 | A1 | 7/2011 | Watanabe |
| 2011/0225520 | A1 | 9/2011 | Watanabe |
| 2012/0030560 | A1 | 2/2012 | Yano |
| 2012/0047234 | A1 | 2/2012 | Terayoko |
| 2012/0166934 | A1 | 6/2012 | Kihara |
| 2012/0223951 | A1 | 9/2012 | Dunn |
| 2014/0173413 | A1 | 6/2014 | Godoy |

FOREIGN PATENT DOCUMENTS

| | | |
|---|---|---|
| KR | 10-2010-0089339 A | 8/2006 |
| KR | 10-2009-0114759 A | 11/2009 |

OTHER PUBLICATIONS

International Search Report and Written Opinion for Int. App. No. PCT/US2013/045046; dated Nov. 13, 2013.
International Search Report and Written Opinion for Int. App. No. PCT/IB2014/001314; dated Dec. 19, 2014.
Non-Final Office Action for U.S. Appl. No. 14/290,839, dated Jun. 28, 2016.
Applicant Response to Non-Final Office Action for U.S. Appl. No. 14/290,839, filed Dec. 28, 2017.
Final Office Action for U.S. Appl. No. 14/290,839, dated Feb. 7. 2017.
International Search Report and Written Opinion for Int. App. No. PCT/US2015/062022; dated Apr. 8, 2016.

* cited by examiner

ACTIVE WEB PAGE CONSOLIDATOR

RELATED APPLICATION DATA

This application claims the priority date of provisional application No. 61/657,882 filed on Jun. 10, 2012.

BACKGROUND

The present method relates to methods of consolidating web pages, and more particularly, to a method of consolidating web pages by periodically collecting data from a user-selected group of web resources for display to the user.

The number and variety of information sources available to a user on the internet is vast. It is often difficult for a user to visit a list of their favorite websites in a time thrifty manner in order to remain current on information, especially if the user has a large list of web sites she wishes to navigate. It is also difficult for a user to remain current on a number of favorite sites or to be quickly brought up-to-date on changes through simple series navigation of these sites since leaving one site to navigate to another will cause them to miss updates at the site they have left. These missed updates may or may not appear or be present the next time the user navigates to the un-viewed site as content on the internet can change quickly.

The user may have many favorite websites, blogs, social sites and other web accessible information sources that they frequent for business or personal use throughout the day. The user may spend large amounts of time navigating from one information source to another in order to get and remain current on changes at those sources. The user may open many tabs in order to quickly switch from one source to another in an attempt to stay current on these many sites. The user may bookmark a multitude sites and navigate to those bookmarks in order to stay informed. All of these solutions require that the user leave a first source of information to go to another and while at the other source, they risk the possibility that important information has changed on sites they are not viewing and if they do not navigate to that site quickly enough that update will be lost. A user may have so many favorite sites that they may lack sufficient time to effectively navigate all of them or may forget to navigate to one or many of them.

The user may employ news aggregators to stay abreast of news and information on the internet. Aggregators typically use RSS (Rich Site Summary) or (Really Simple Syndication) to present information summaries on the user's personal page. Publishers of information such as news sites, blogs or audio and video providers can choose to syndicate their information on RSS so that the user, usually by way of an aggregation site such as iGoogle, Pulse, Flipboard and the like may view these summaries or headline information on a single page or multiple pages. A user of an aggregation site may select many information sources which would then be displayed on a page so that updates from many sources can be quickly read and managed.

In order for RSS to work however, a publisher must first post to an RSS feed which is then sent out to users that have requested or subscribed to that feed on their selected aggregation site. The information that a publisher selects to publish may not be the most important or even the most current and therefor the feed may not be a reflection of what is current on the publisher's actual site or most recent in the world of information. RSS feeds may not be prioritized in a hierarchical manner and stories that are less news worthy can be placed ahead of those that are more important. While an RSS user may be able to select a feed source, they cannot select the exact portions of a site that get published and may have to endure many undesired feeds and summaries before receiving one that is needed. It is possible that important information may be delayed by a publisher to an RSS feed as they may choose to prioritize placement of that information elsewhere. Finally, many publishers on the internet simply do not provide RSS feeds, especially more esoteric sites or sites traditionally not thought of as requiring information feeds, such as shopping, couponing, hobby and other consumer based sites and interests.

Compounding the difficulties of the aforementioned solutions is the dramatic shift from desktop and laptop computers to portable devices such as smart phones and tablets and even wearable portable devices which access internet based information. These portable devices can often experience difficulty in connecting to the internet as they have no hard connection and rely on wireless data transfer. When these devices are within a Wi-Fi hotspot or wireless computer network, connectivity and speed of data transfer is not a concern but this type of service may not always be available. By their very nature, these devices are meant to be portable and a user may be in areas where there is no Wi-Fi access and poor cell reception. In these cases navigating modern websites, which often have home pages from one to several megabytes can be very time consuming, problematic or even impossible. Further complicating this problem are the numerous animations, videos or sound bites which may run on a site and require even more bandwidth and time to load. Furthermore, computer resources are used to maintain multiple open browsing sessions, which slows the performance of the computer.

What is needed is a method of allow a user to easily select only the portions of website that are important to them for organization and presentation on an Internet based page or pages. This method must allow the user to quickly view important information from many sources at one location. The user selected sites or portions of sites that have been organized on their page must be refreshed frequently enough so that the user can be kept up-to-date on the latest information on any site or portion of site selected in near real time. The data required to download this information must be kept to a minimum in order to accommodate rapid updates as well as overcome the limitations of poor or spotty cell coverage when a Wi-Fi hot spot is unavailable, especially for mobile devices such as smart phones, tables and wearable devices.

SUMMARY OF THE INVENTION

A method of providing content to a user is provided, which includes the steps of communicating a resource address from a user input on a local computing device to a web server; communicating the resource address from the web server to a queue server, where the queue server stores a list of resource addresses; entering the resource address into the list of resource addresses; dequeueing the resource addresses; communicating the resource address to a capture server; building a site page associated with the resource address within a browser on the capture server; creating an image file representative of the site page; and communicating the image file to the local computing device.

Optionally, the method may include the further steps of receiving a crop instruction coordinates from the user entered into the local computing device, where the crop instruction coordinates define at least a portion of the image file to be displayed on the local computing device; storing the crop instruction coordinates on a database; creating a cropped image from the portion of the image file upon a subsequent dequeue; and communicating the cropped image to the local computing device.

BRIEF DESCRIPTION OF THE SEVERAL VIEWS OF THE DRAWINGS

Additional objects and features if the method will be more readily apparent from the following detailed description and appended claims when taken in conjunction with the drawings, in which:

Figure 1:
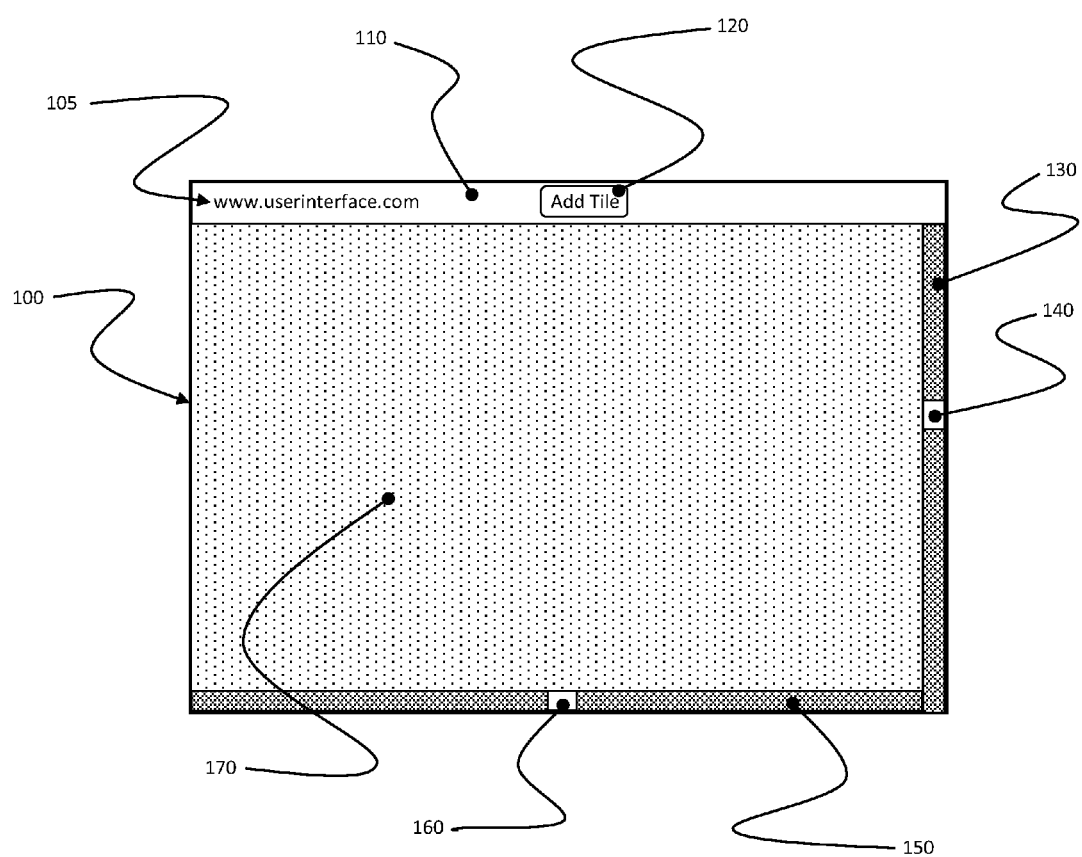
FIG. 1 shows the site where the application resides and the user interface screen before tiles have been added.

LISTING OF REFERENCE NUMERALS OF FIRST-PREFERRED EMBODIMENT 100 main graphical user interface screen
105 URL of the service
110 top menu bar
120 add tile button
130 vertical scroll bar
140 vertical scroll button
150 horizontal scroll bar
160 horizontal scroll button
170 viewing area
200 add tile window
210 URL entry field
220 capture URL button
230 suggested URL's
300 user requested URL
400 captured URL image
410 second story
420 third story
430 fourth story
440 first story
450 URL title
500 capture service
505 web server
515 database
520 world wide web
525 capture server
530 queue server
600 web browser
700 x axis
710 y axis
720 x axis origin
730 y axis origin
740 last point on x axis
750 last point on y axis
800 image frame
810 x axis image frame start location
815 frame start point
820 x axis image frame end location
825 frame end point
840 y axis image frame end location
850 y axis image frame start location
900 main screen x axis origin
910 main screen y axis origin
915 main screen x axis
920 main screen x axis last point
925 main screen y axis
930 main screen y axis last point
1010 x axis main screen placement location
1015 first image placement point
1020 y axis main screen placement location
1110 x axis main screen placement location
1115 second framed image
1120 y axis main screen placement location
1125 third framed image
1130 second image placement point
1135 third image placement point
1300 first site URL
1310 second site URL
1320 third site URL
1500 web browser

DESCRIPTION OF THE PREFERRED EMBODIMENTS

The detailed descriptions set forth below in connection with the appended drawings are intended as a description of embodiments of the invention, and is not intended to represent the only forms in which the present invention may be constructed and/or utilized. The descriptions set forth the structure and the sequence of steps for constructing and operating the invention in connection with the illustrated embodiments. It is to be understood, however, that the same or equivalent structures and steps may be accomplished by different embodiments that are also intended to be encompassed within the spirit and scope of the invention.

Accordingly, the present method provides an easy to use graphical interface for a user to capture, frame, organize and view selected portions of websites, while they are refreshed at a rate which allows the user to remain up-to-date in near real time on their important websites.

This is accomplished by providing a web based site to load a recently captured image of a user specified web site URL (uniform resource locator). Tools are provided to allow the user to frame the portion or portions of a site they wish to have displayed on their user interface screen. The framing specifications unique to that user and selected URL's are saved to a server for later retrieval and use. Tools are also provided to allow the user to organize multiple framed selections of web sites on a page or pages of their user interface screen for best viewability. These tools allow for movement, placement and sizing of framed portions of selected sites and a means for reframing the same to include additional information or exclude unwanted information. These various preferences in sizing and placement are also saved to a server for later retrieval and use.

The framed portion or portions of the user specified URL's are loaded onto a user interface screen when the user visits their personalized site. This is accomplished by capturing a recent image (usually in bitmap format) of a URL site or sites specified by the user and applying the saved framing, sizing and placement settings to the newly retrieved image or images. This process or capturing, framing, sizing and placing of URL sites is repeated often enough and images of the same refreshed on the user interface screen so that any time a user visits their user interface screen, they are presented with the most recent information of their one or many site URL's for quick review.

From the user's interface screen, they are able to select the framed site causing the web browser to automatically open a tab and navigate to that URL site or alternatively, opening a frame or portal to the sites URL within the user interface screen giving the user full access to information they had been made aware of at their home page.

The present method comprises a web based application with the substantial portion of the executable code and processing taking place happens at remote servers, thus reducing the work load at a users' device. However, this method may include allocating or breaking up tasks so that processing may be shared between remote servers and a user's device or all of the processing may be handled at the user's device.

FIG. 1 shows an illustration of the graphical user interface known as the application screen in a preferred embodiment. This screen may be accessed from a device with internet access or this screen may work in conjunction with a software application that either partially or fully resides on the device being used to access the web based service. This screen is comprised of the main graphical user interface screen (100) having been directed to the web location where the service is resident by way of the URL of the service (105) which is shown in the top menu bar (110).

In the top menu bar there is an "Add Tile" button (120) which activates the process of adding a tile. Vertical scroll bar (130) with vertical scroll button (140) is located on the right side of the main graphical user interface screen and allows images not visible in the viewing area (170) and located above or below the viewing area (170) to be viewed by sliding the vertical scroll button (140) in the direction of the hidden image located off the visible page. The horizontal scroll bar (150) with horizontal scroll button (160) allows images locate to the left or right but outside of the viewing area to be viewed by sliding the horizontal scroll button (150) in the direction of the hidden image.

Figure 2:
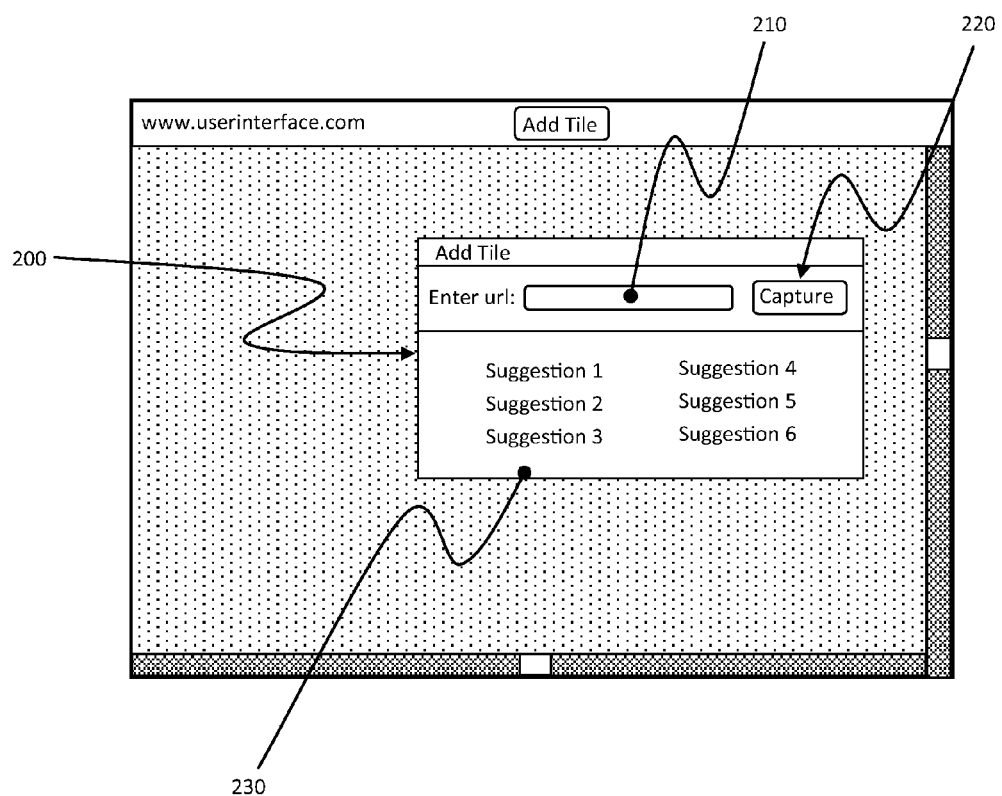
FIG. 2 shows the user interface screen after the 'Add Tile' button has been selected.

FIG. 2 shows the add tile window (200), on the main graphical user interface screen (100). The add tile window (200) having been requested by selecting the add tile button (120). Within the add tile window (200) are three areas or features, the first is the URL entry field (210), where a user may enter the address of any navigable URL for capture. The second is the capture URL button (220) which when selected causes an image of the URL to be captured. And the third is a list of suggested URL's (230) which a user may select from in order to quickly begin creating URL captures. The list also serves to help educate users to the different types of websites that exist. This list may have many categories such as news, shopping, weather, travel, cars and many more.

Figure 3:
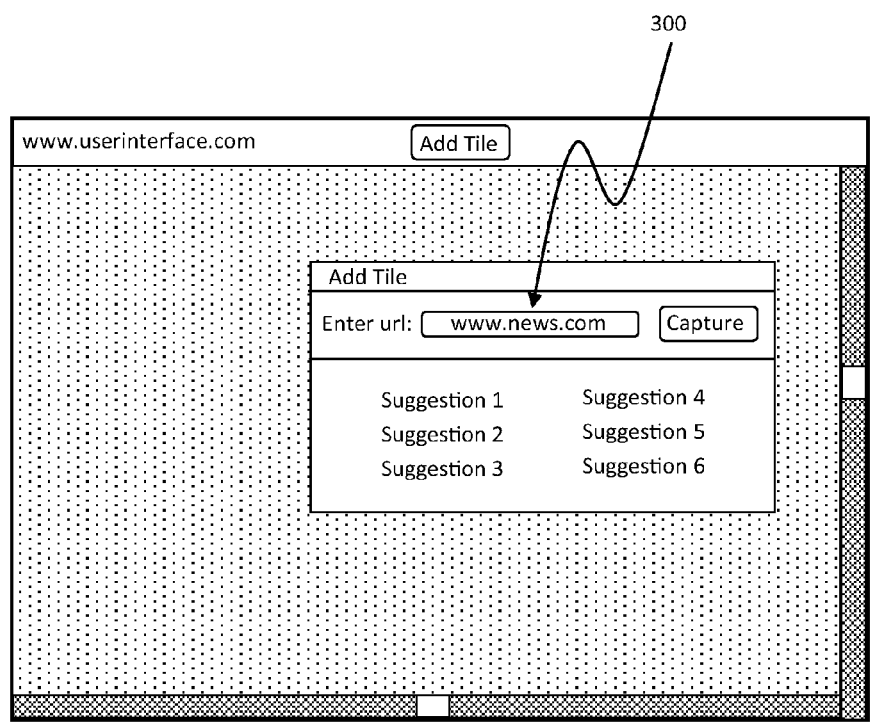
FIG. 3 shows the user interface screen in which a user specified site URL has been entered.

FIG. 3 shows a specific URL (300) address that has been entered in the URL entry field (210). A user may enter a URL that is not on the list of suggested URL's (230) or one that is on the list. If the URL is on the list, predictive text functions may be used that predict the desired URL based on the characters that have been entered. For instance, if a user has entered the letters "new", it may be predicted that the users wishes to enter "news" or "New York". The predictions may be based on URL's in the list of suggested URL's (230), URL's stored in memory that other users have requested, or a generic list of words, names or URL's known to exist on the internet. By selecting the capture URL button (220), the process of capturing an image of that URL begins.

Figure 4:
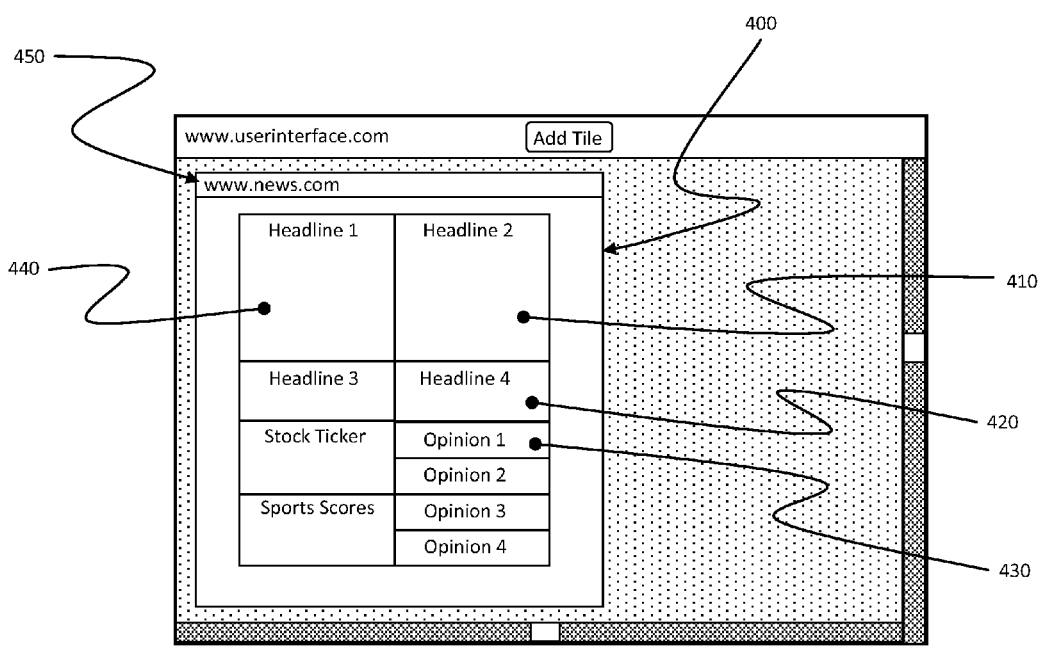
FIG. 4 shows the user interface screen presenting a captured image of a user specified site URL.

FIG. 4 shows the captured URL image (400) after it has been captured and presented in the main graphical user interface screen (100). This captured image may of any website URL and may have many components or areas of interest to the user. For the purposes of this example, a news URL has been selected and several headlines such as first story (440), second story (410) and third story (420) are visible. An example of a news opinion piece is shown in fourth story (430). The image captured may have many sections and some may be of interest to a user and some may not. It is possible that the entire page is of interest to the user.

Figure 5:
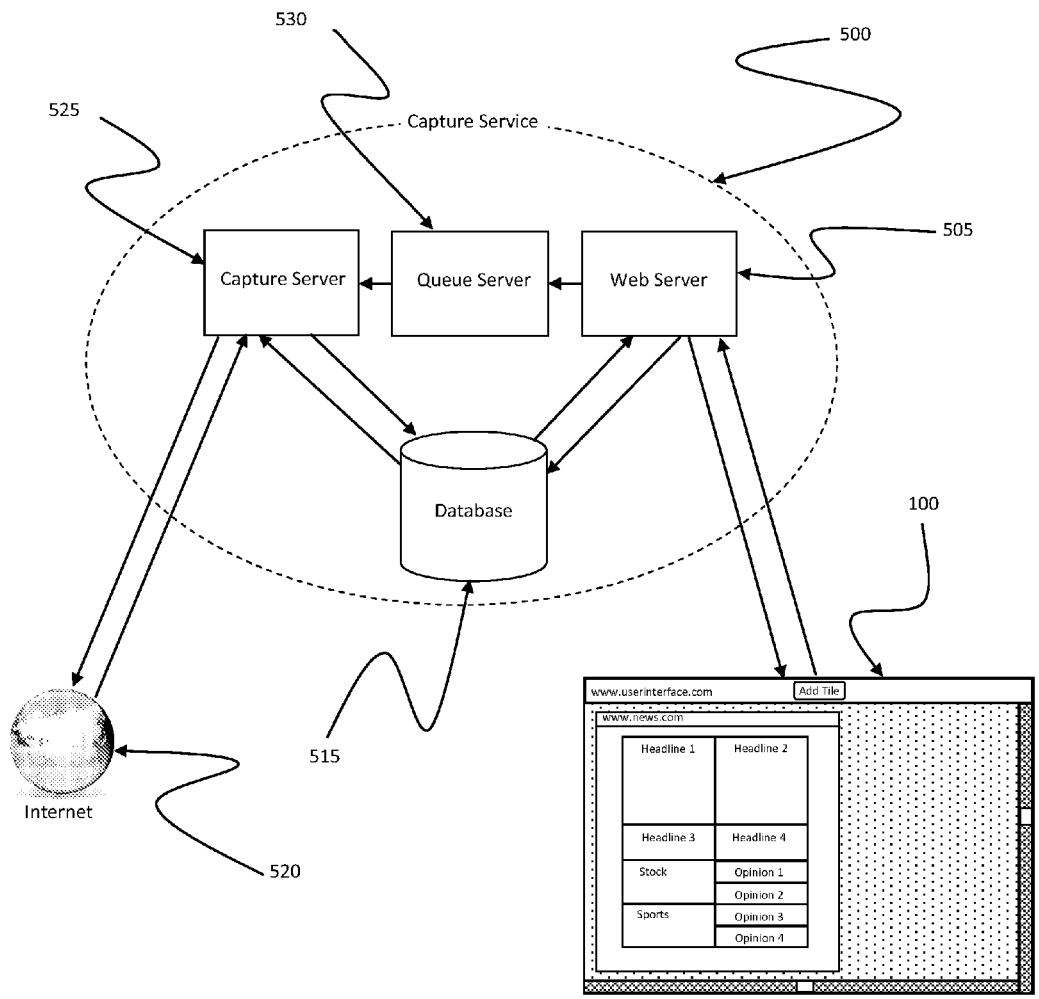
FIG. 5 shows the architecture of the capture service when an image of a site URL has been requested.

FIG. 5 shows a logical flow of the process to obtain captured URL image (400) for viewing and use by the user. The structure of this process and the methods used show only one preferred method and many such methods may be possible to accomplish the same task. This description is not meant to limit the or otherwise exclude other methods that may accomplish the same task. This method is also described as being a web based service in its preferred embodiment where the capture service (500) and other tasks are handled at remote servers and the presentation of the final information is presented at the main graphical user interface screen (100). However, this method may also be accomplished by utilizing a user's device processor and or resources to perform all or a part of the same operations described in this preferred embodiment. Any or all of the functions described in the capture service (500) may be broken into additional sub tasks or combined into larger tasks. The server task allocations described may be virtual or physical depending on the type of equipment and or software being used.

At the core of FIG. 5 is the capture service (500). The capture service (500) is comprised of several basic functions, the web server (505), the queue server (530), the capture server (525), and the database (515). When a request is made by a user from the main graphical user interface screen (100) for a URL image, the web server (505) receives this request. The webserver (505) will first check the database (515) to see if an image of the requested URL has already been captured, as would happen if another user had previously requested the same URL or if the URL were on the list of suggested URL's (230). If the image is stored in the database (515), then that image is returned to the user for display on the main graphical user interface screen (100). If the image is not in the database (515), then the web server sends the URL to the queue server (530). The queue server is tasked with queuing up one or more capture servers (525). It maintains a list of URL's to be captured; and as the capture server (525) captures the URL image, the capture server (525) takes the next URL off the stack in the queue server (530). If there is only one capture server (525) then the task of capturing URL's place in the queue server (530) will take place in series (or one capture after the other). For example, a list of URL's is stored on the queue server (530), which represent the requested URL's from a plurality of users. The capture server (525) can sequentially capture each URL one at a time as the requested address is received by the queue server (530). Once a URL on the list has been captured, that URL can be placed on or near the bottom of the list. In this way, a cycle of web capturing is created, where each URL on a list can be refreshed by a new capture as the queue server (530) cycles through the list. The list can change dynamically, as users request new URL's not currently on the list or if all users remove a URL from their requested sites.

However, more rapid progress can be made in capturing URL images if multiple capture servers (525) are used and the work is performed in parallel. The queue server (530) can also be used to prioritize more important URL's for immediate capturing. If a user has request the capture of a new URL who's image does not reside in the database (515), then that image can be placed at the front of the queue for immediate capture, reducing the amount of time that a user will wait for a first image. Further, more popular URL's or URL's that change more frequently may be biased to the top of the list. Since capturing a URL requires greater resources than is required by the queue server (530), it is generally desirable to create a system with multiple capture servers (525) being coordinated by a single queue server (530). This system can be expanded so that there are multiple subsystems comprising one queue server (530) with one or more capture servers (525).

Figure 6:
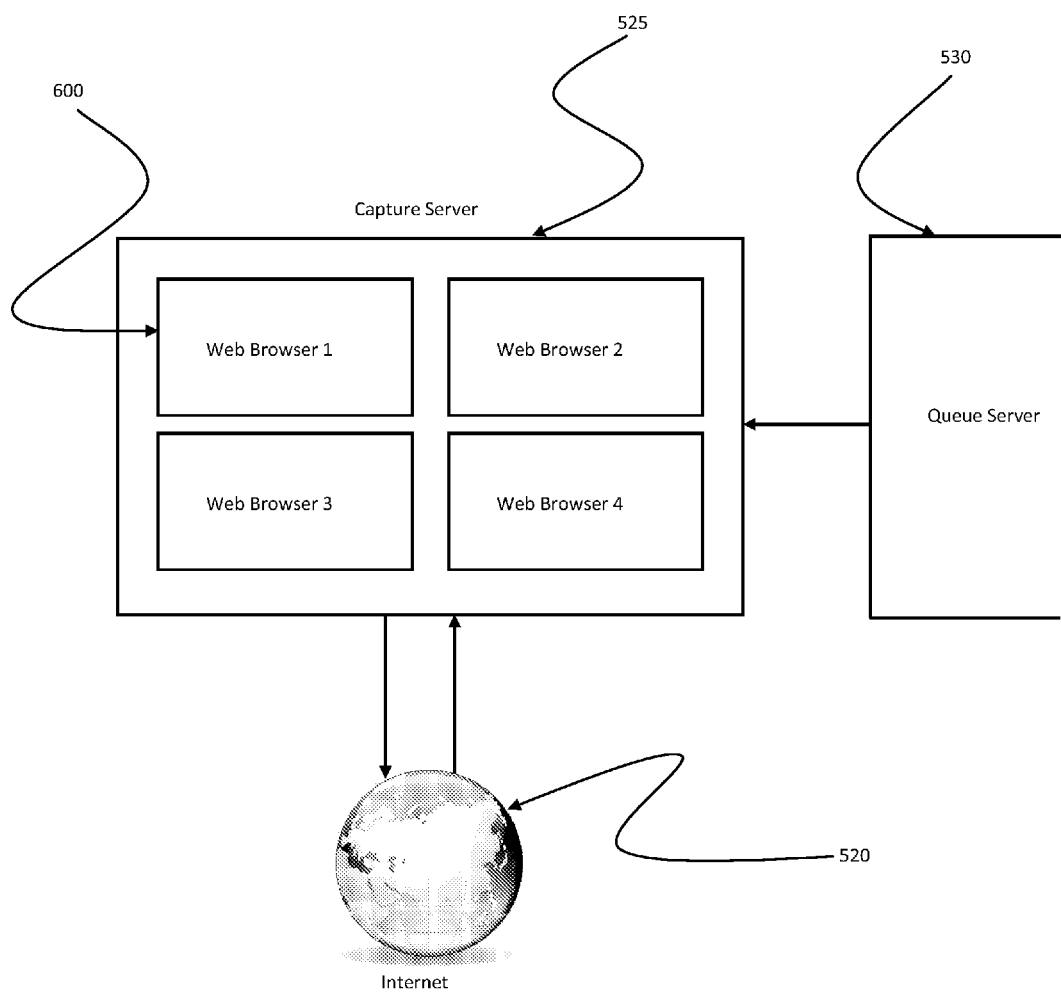
FIG. 6 shows the use of multiple web browsers in the capture server.

Referring to FIG. 6, the capture server (525) has at least one version of a web browser (600) and quite often many versions of a web browser such as FIREFOX, INTERNET EXPLORER, or SAFARI operating within it. The web browser (600) having taken a request for a URL from the queue server (530) proceeds to go to the internet (520) to make a captured URL image (400) of the site by making a GET request to check the sites viability. GET is a standard computer request made of any site to check if the site exists and if its information is OK. If the site is OK then the HTML (Hyper Text Markup Language) code is retrieved from the URL site and the web browser (600) begins to build the site page according to the HTML code provided. Once the site URL is fully assembled within the browser, a screen shot of the site is taken by the capture server (525). This screen shot is in the form of a bitmap type image such as PNG, JPEG or GIF with the preferred image type being PNG (Portable Network Graphics) or JPEG (Joint Photographic Experts Group). The resolution of this image can vary but one common resolution is 800 pixels wide by 600 pixels high. The height can vary greatly depending on the height of the web site URL assembled using the HTML code. If the image is a JPEG and image has 3 bytes of color then the total raw image size is 1.44 MB. Using compression that size of this file cane be reduced greatly and $1/10^{th}$ compression is common making the 1.44 MB image 0.144 MB or 144 KB. This freezing of the site image and subsequent compression helps transfer large amounts of website information to portable devices and will be discussed in greater detail below.

Once a captured URL image (400) is made from a site, it is sent to the database (515). The web server (505) having continued to make periodic requests of the users desired captured URL image (400) now finds an image to return to the user. This image is then sent to the user for display on the main graphical user interface screen (100).

In doing this process, a site which could require several megabytes to load and require constant connection to the internet and use of bandwidth to execute animation, video and audio can now be delivered to a user with minimal bandwidth and connectivity and with greatly increased speed.

Figure 7:
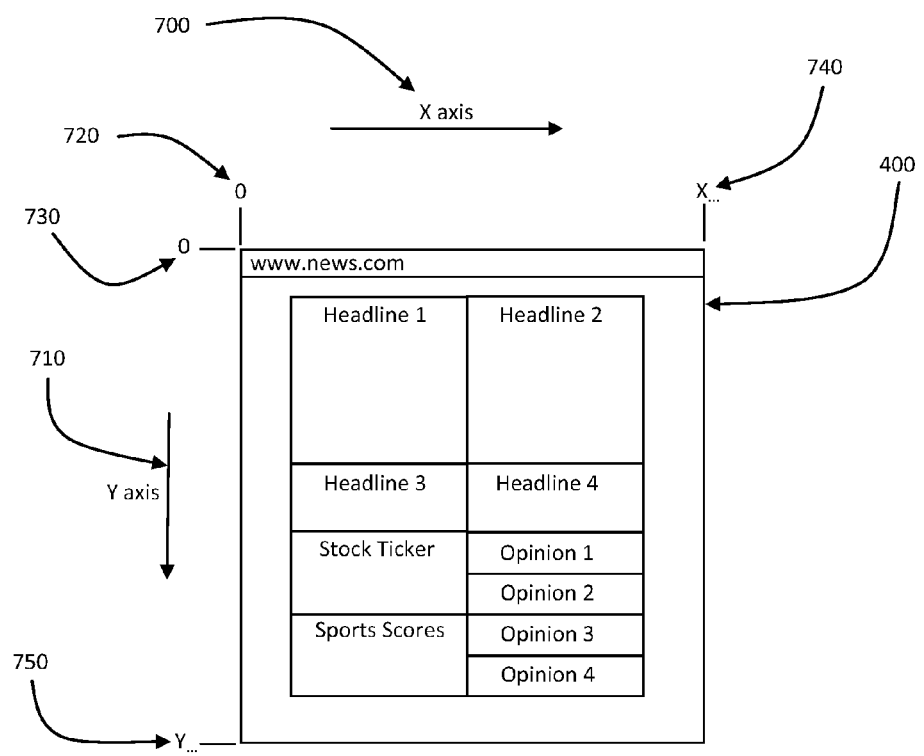
FIG. 7 shows a pixel based X, Y coordinate system being superimposed on a captured site URL image.

In order to further streamline data usage and to eliminate unwanted information, the user has the ability to present only the portion of the whole captured URL image (400) that they wish to see on their main graphical user interface screen (100). Referring to FIG. 7, the captured URL image (400) has a grid system super imposed over it where the pixels which make up the image represent individual graduations of the grid system. This grid system creates a coordinate system where the number of pixels in the width of the image represents the length of the x-axis (700) and the number of pixels in the height of the image represents the height of the y-axis (710) with each pixel representing one unit along both the x-axis and the y-axis. By establishing the upper left corner of the image as the x-axis origin 720 and y-axis origin (730) the origin (which are assigned the coordinates of 0,0 in the present example) of the coordinate system can be established. The width of image runs to the right from origin (730) and along the x-axis (700) and the height of the image runs down from the origin (730) and along the y-axis (710).

The last point on the x-axis (740) may be defined as the maximum pixel width of the captured URL image (400); and the last point of the y-axis (710) may be defined as the maximum pixel height of the captured URL image (400). If for example, the captured URL image (400) is 800 pixels wide and 600 pixels high then the total width of the x-axis (700) is 800 units with 800 being the last point on the x-axis (740) and the total height of the y-axis (710) is 600 units with 600 being the last point on the y-axis (750). By using this system it becomes possible to locate desired items on the captured URL image and to create borders to include only the portions of the image the user desires. Many other types of coordinate systems may be employed at this point to accomplish the same task however; pixels are used as a preferred method because of its natural association to the image and convenience.

Figure 8:
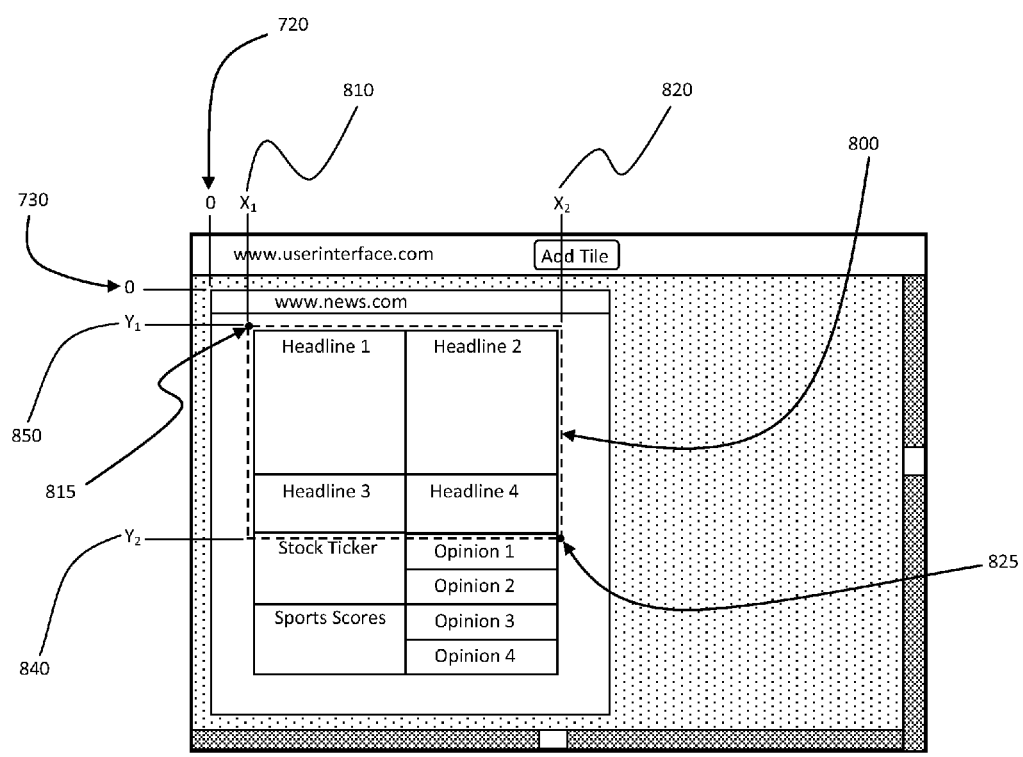
FIG. 8 shows user selected framing of a portion of the captured site URL image using pixel based X, Y coordinates.

Using the coordinate system described above and referring to FIG. 8, an image frame (800) can be created of the captured URL image (400) in the main graphical user interface screen (100). Once the image is captured and presented to the user on the main graphical user interface screen (100), a default framing tool is presented to the user so that by either using finger action on a touch screen or by using a mouse or touchpad on a desktop computer the image frame (800) can be sized to include the portions of the captured URL image (400) the user wishes to see on their main graphical user interface screen (100). Although, the image frame (800) is shown as being rectangular, other user selected shapes are possible, such as variation of an L-shape, circular shapes, custom or hand-drawn frame shapes, and the like.

Once the x-axis origin (720) and y-axis origin (730) have been established, the framing of the image can be accomplished with respect to this primary origin. By first selecting an x-axis image frame start location (810) and a y-axis image frame start location (730), a frame start point (815) can be defined as the upper left point of the image frame (800). Using finger motion on a touch screen or mouse movement on a computer or other appropriate selection means, a frame end point (825) can be established. The width of the frame may be defined as the x-axis image frame end locator (820) minus (−) the x-axis image frame start location (810); and the height of the frame may be defined as the y-axis image frame end location (840) minus (−) the y-axis image frame start location (850). Upon completing the image frame (800) all information outside the defined frame is removed or cropped using known software tools. The image frame (800) specification is unique to a particular user, and this data in the form of the URL identity and associated coordinates is saved in database (515) for later retrieval.

Figure 9:
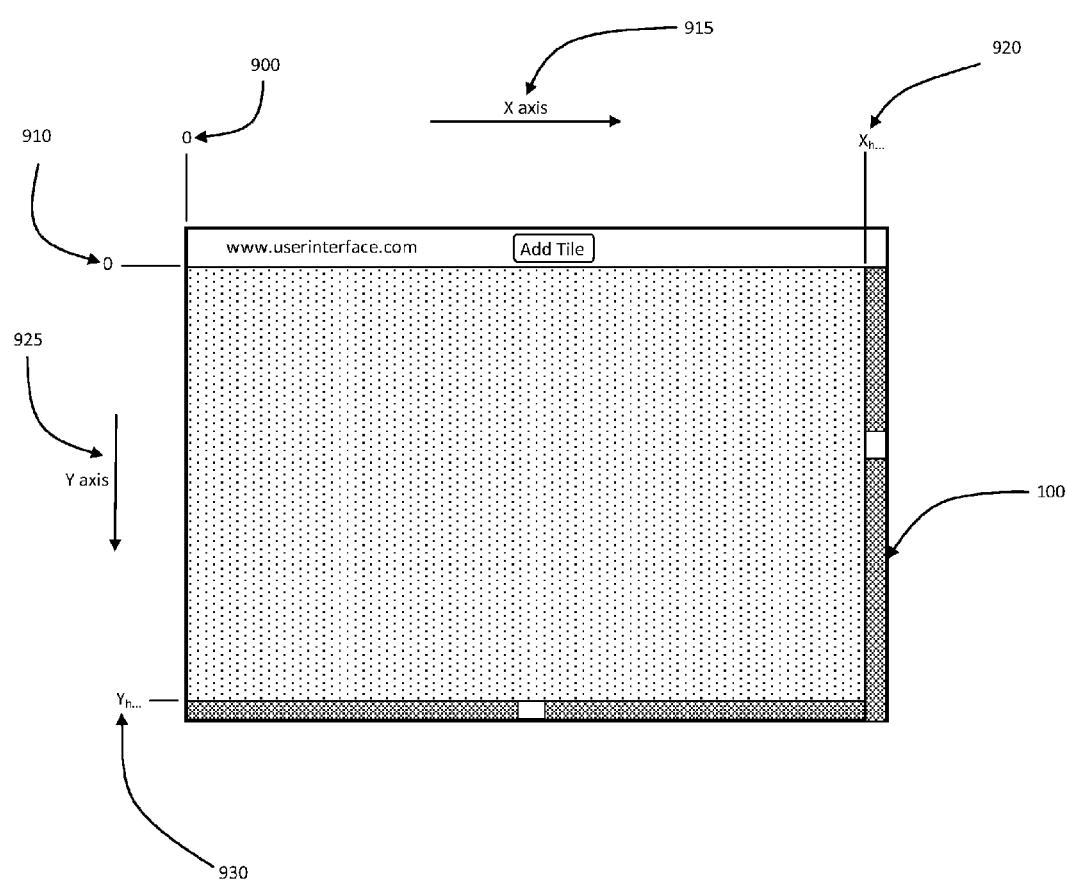
FIG. 9 shows a pixel based X, Y coordinate system being superimposed on the user interface screen.

Referring to FIG. 9 and the main graphical user interface screen (100), the size of this screen can vary depending on the device the user employs to access the URL of the service (105). Typically device manufacturers define their screen size in terms of pixels. For example, an APPLE IPHONE 5 has a pixel resolution of 1136 pixels by 640 pixels; and a SAMSUNG GALAXY 3S has a resolution of 1920 pixels by 1080 pixels. Because a user can place the image frame (800) of the captured URL image (400) anywhere on the main graphical user interface screen (100) as desired, it is important to establish a coordinate system for the device screen so that location may be saved to the database (515) allowing the user to view their placed image in the same location every time they visit the URL of the service (105). To accomplish this, the device screen which is made known electronically to the service when a user visits the service is separated into a main screen x-axis (915) and a main screen y-axis (925). The origin of the screen is set at the upper left corner of the usable space on the screen. The usable space would exclude things like the top menu bar. The main screen x-axis origin (900) may be defined as the left most location of the main screen; and the main screen x-axis last point (920) may be defined as the last point on the main screen x-axis (915). This main screen x-axis last point (920) corresponds to the maximum screen width in pixels of the device. The main screen y-axis origin (910) may be defined as the upper most location of the main screen that is usable to the user; and the main screen y-axis last point (930) may be defined as the last point on the main screen y-axis (925). This main screen y-axis last point (930) corresponds to the maximum screen height in pixels of the device. This establishes the preferred method for creating a coordinate system on the main graphical user interface screen (100). Other methods and units may be used and various scaling methods may be employed to keep the true location of an image frame (800) in the same location irrespective of screen resolution. Such scaling for instance would place the upper left corner of an image if it were placed in the center of the screen of an APPLE IPHONE 5 at (568 px, 320 px) if the same user access their service from a SAMSUNG GALAXY 3S the upper left corner of the same image would appear at (960 px, 540 px).

Figure 10:
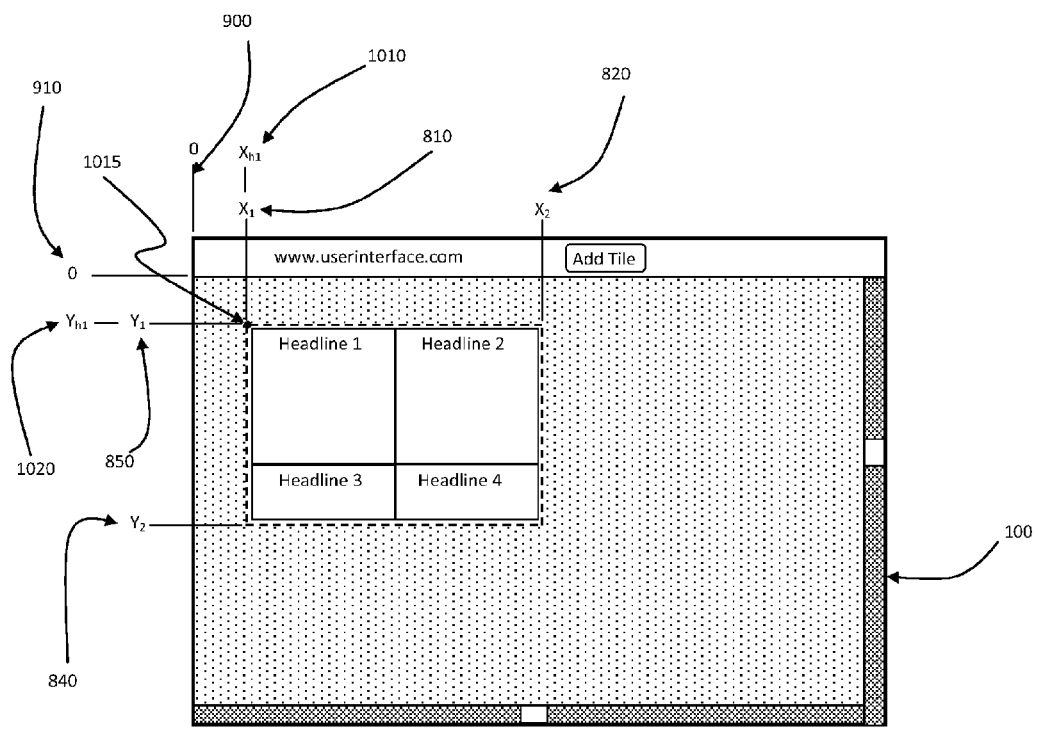
FIG. 10 shows the user selected portion of the captured site URL being located and placed in the coordinate system of the user interface screen.

By combining the two coordinate systems described above, one for the user defined image frame (800) and the other for the main graphical user interface (100), the user can place their image frame (800) anywhere on the main graphical user interface (100) and the service having stored this information in database (515). Thus, the user can expect to find the placement of images in the correct location whenever they visit the service. Referring to FIG. 10, this is accomplished by recording the user placement of image frame (800) in the main graphical user interface screen (100) by saving the point at which the frame start point (815) is placed in the main graphical user interface screen (100) and coincides with the x-axis main screen placement location (1010) and the y-axis main screen placement location (1020). This location defining the first image placement point (1015). For orientation purposes the x-axis image frame end location (820) extends to the right of the first image placement point (1015) and the y-axis image frame end location (840) extends below of the first image placement point (1015).

Figure 11:
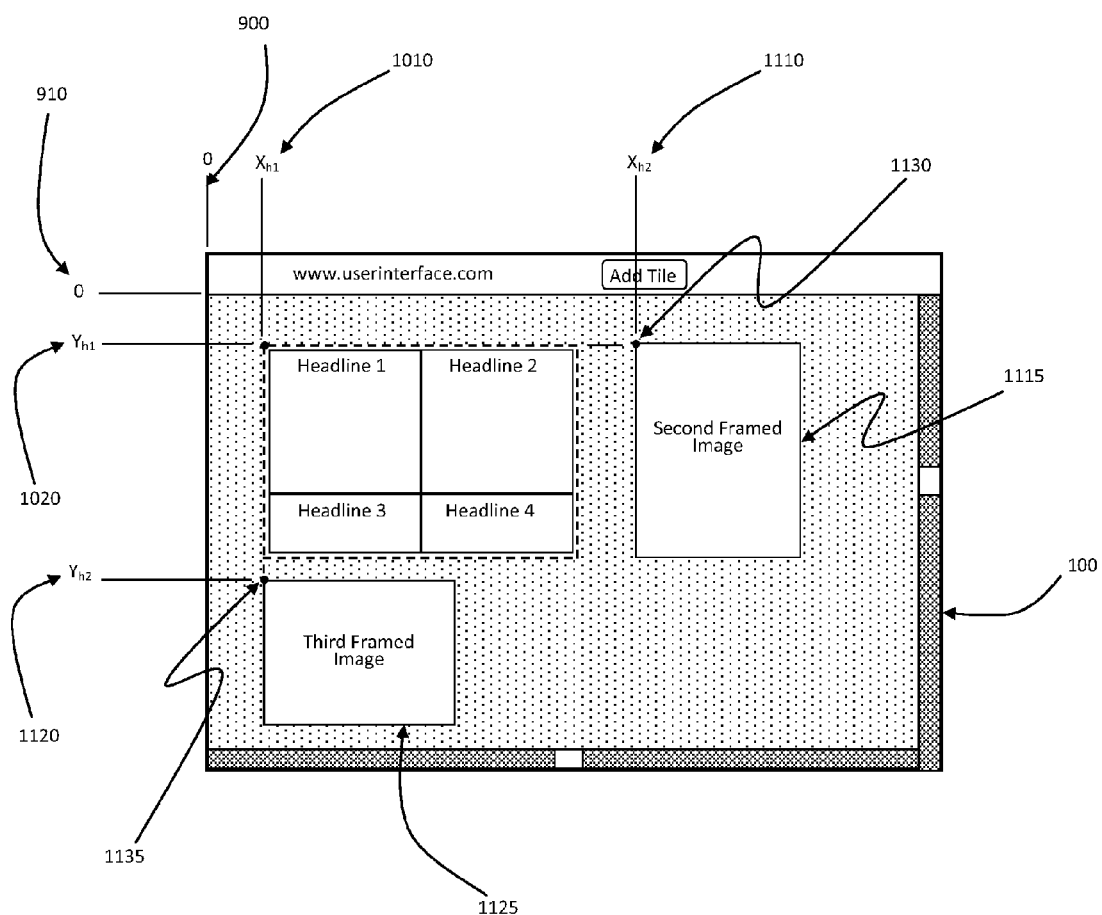
FIG. 11 shows multiple user specified site URL's being placed on the user interface screen.

FIG. 11 shows an expansion of the method defined thus far and illustrates the placement of a second framed image (1115) at second image placement point (1130) which is coincident with second framed image x-axis location (1110) and the placement of a third framed image (1125) at third image placement point (1135) which is coincident with third framed image y-axis location (1120). This process may be repeated as many times as the user wishes to create a page where they will be able to find all their favorite web sites framed according to their specifications and place on their main graphical user interface screen (100). Being web accessible this information may be accessed from any device with internet access anywhere in the world.

Figure 12:
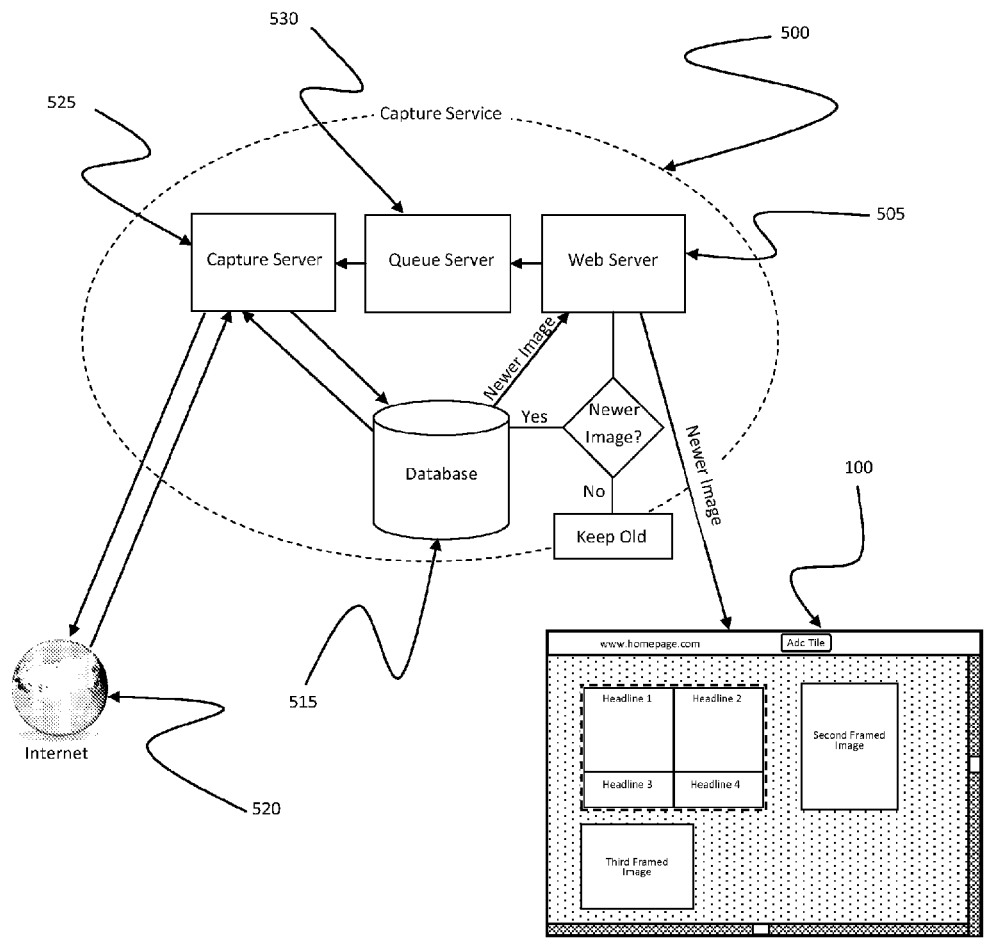
FIG. 12 shows the architecture of the capture service when repeated images are taken of a site URL for updating.
Figure 13:
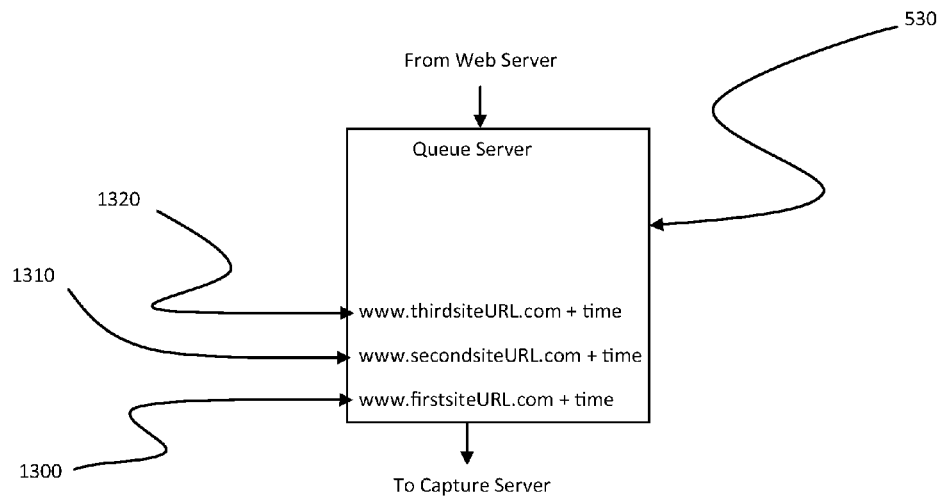
FIG. 13 shows the queue server with a stack of URL sites to be captured.

Referring to FIG. 12, where the process of updating the framed images of (800, 1115, and 1125) on the main graphical user interface screen (100) is shown. This process works in conjunction with the queue server (530) shown on FIGS. 13 and 14. FIG. 13 shows a first site URL (1300), a second site URL (1310), and a third site URL (1320) in sequence in the queue server (530) and presenting these sites to be captured in this order to capture server (525). Once the capture server (525) has captured the image of a next requested site URL, that URL is placed back on the stack or list of URL's to be captured by the capture server (525).

Figure 14:
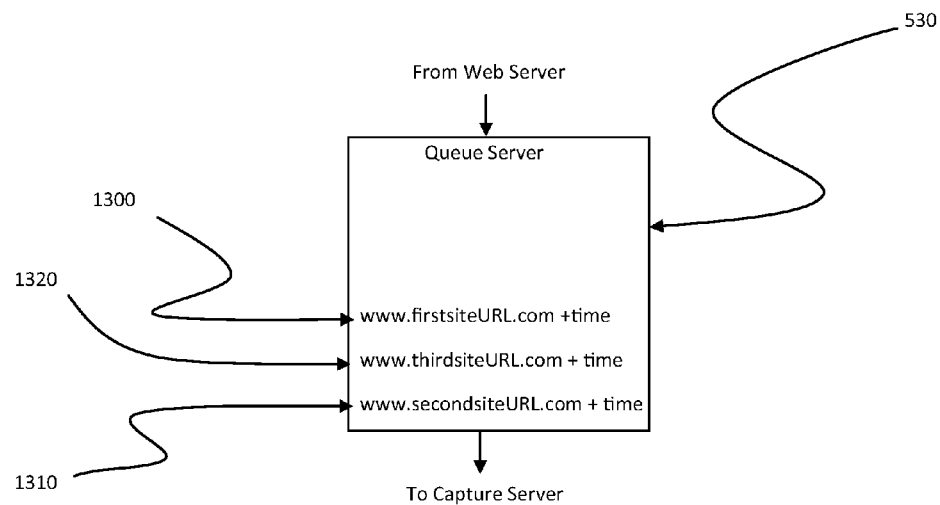
FIG. 14 shows the queue server with a stack of URL sites to be captured where the URL most recently captured is placed back on the stack.

FIG. 14 shows the first site URL being placed back on the stack of URL's to be captured thus causing the entire stack of URL's within the queue server (525) to be continually recaptured in the order of stack placement. In this way, newer images of a site URL will be continually fed to the database (515) and older images replaced with newer images as they are made available by the capture server (525). In order to track the recentness of an image being captured a time stamp is added to the image name being saved in the data base. In this way, it will be known to the web server (505) whether a new image of a user specified site URL is available. The number of URL's in the stack and the speed with which the capture server (525) can capture images of individual site URL's dictates the total cycle time of the stack and hence the refresh rate of any of the URL's in the stack. This refresh rate may be may be decreased, providing faster URL updates by reducing the number of URL's on the stack or by capturing URL site images faster. This architecture of the capture service (500) may be scaled to include as many services as is necessary to capture URL sites in a time that provides the timeliest information to users. Within the capture service (500), any server may be scaled in number of size to best accomplish the task and separation of the tasks may be physical or virtual or may be made more granular according to tasks being performed or less granular.

Referring again to FIG. 12, logic is added to the capture service (500) to take advantage of newer images being captured and stored in the database (515). The web server (505) accessing the complete list of user requested site URL's from database (515), makes continual checks of the database (515) for a newer image of a user requested site URL by comparing the time stamp on the image current being displayed on the main graphical user interface screen (100) with the time stamp of the image of the same site URL being held in database (515). If a newer image is available it is delivered to the web server (505) for immediate delivery to the main graphical user interface screen (100) where it is inserted at the users specified location and according to their sizing requirements and replacing the older image. In this way, the user is given a continuous stream of refreshed images of their requested site URL's that have been modified and placed according to their specifications keeping them fully up-to-date on all of their favorite sites.

The above process can be scaled to include as many users as necessary, where use of usernames and passwords stored in database (515) allows for organization and mass modification of images, according to user specified settings so that exact customization of information specified by a user can be maintained. Of course this method may be expanded to include millions of users with millions of URL's being captured all being framed according to the users specifications and placed on their graphical interface screen at the users specified location. For example, a single URL image can be captured and distributed to numerous subscribed users, with each user only receiving the portion of the URL image framed by that user. Thus, even though only one URL image is captured on each cycle with this example, one user may receive the upper right corner of the URL image, while a second user may receive the upper left corner of the URL image. The user's device may receive the entire captured image and display only the selected frame; or the user's device may receive just the framed portion of the image to save on bandwidth and resources.

Figure 15:
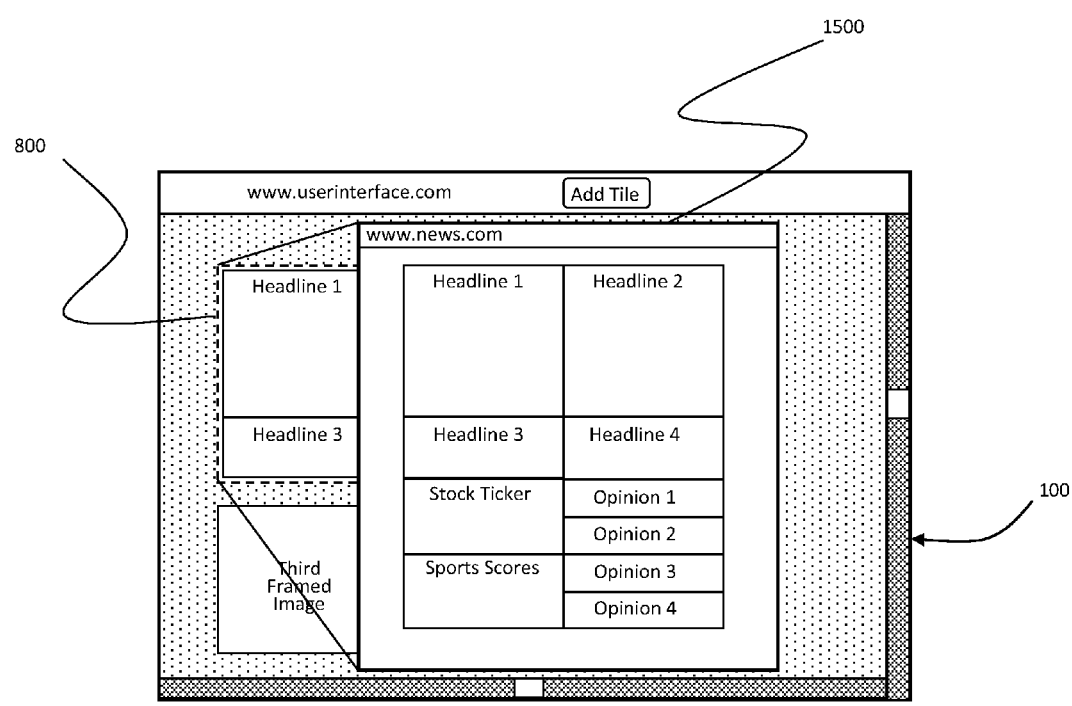
FIG. 15 shows a web browser being opened in the interface screen.

Referring to FIG. 15, if a user is made aware of an update on news or important information through continual refreshing of the main graphical user interface screen (100), a user may want to visit the actual site for a more detailed review of information at the site URL. Since the physical area occupied by a framed image on the graphical user interface screen (100) is known and the site URL associated with that image is also known, a user may touch, click or otherwise select any portion of the area of the framed image and the user can be directed to the actual site. Selecting image frame (800) causes the graphical user interface screen (100) to open a web browser within is screen thereby navigating to the selected site URL for more detailed review by the user. The user may navigate to other locations within this browser or they may close the browser returning to the continually updating main graphical user interface screen (100). Browsing of selected framed images may be accomplished in a number of other ways including the opening of a tab in a browser or opening a browser which hides the main graphical user interface screen in the background.

While particular forms of the invention have been illustrated and described, it will also be apparent to those skilled in the art that various modifications can be made without departing from the spirit and scope of the invention. Accordingly, it is not intended that the invention be limited except by the claims.

What is claimed is:

1. A method of providing content to a computing device, the method comprising the steps of:
providing web server, a queue server, and a capture server;
communicating, by the local computing device, a resource address from the local computing device to the web server;
comparing, by the web server, the resource address with a list of captured resource addresses to determine whether an existing image file of the resource address is stored within a database;
communicating, by the web server, the resource address from the web server to the queue server, wherein the queue server stores a list of resource addresses;
queuing, by the queue server, the resource address in the list of resource addresses;
dequeuing, by the queue server, the resource addresses from the list of resource addresses;
communicating, by the queue server, the resource address to the capture server;
building, by the capture server, a site page associated with the resource address within a browser instance on the capture server;
converting, by the capture server, the site page to an image file;
saving the image file within the database;
communicating, by the web server, the image file to the local computing device from the database; and
queuing, by the queue server, the resource address back into the list of resource addresses for later dequeuing and additional conversion to a second image file;
receiving, by the web server, a crop instruction coordinates from the local computing device, wherein the crop instruction coordinates define a portion of the image file to be displayed on the local computing device, the crop instructions being defined via a user input;
storing, by the web server, the crop instruction coordinates on the database;
creating, by the queue server, a cropped image from the portion of the image file upon a subsequent dequeue, the cropped image being defined by the crop coordinate instructions;
communicating, by the web server, the cropped image to the local computing device; and
displaying the cropped image within the user interface.

2. The method of claim 1 further comprising the steps of:
communicating, by the local computing device, a second resource address from the local computing device to the web server;
building, by the capture server, a site page associated with the resource address within the browser instance on the capture server;
converting, by the capture server, the site page to an image file
receiving, by the web server, a second crop instruction coordinates from the local computing device, wherein the second crop instruction coordinates define a second portion of the second image file to be displayed on the local computing device, the second crop instructions being defined via a user input;
storing, by the web server, the second crop instruction coordinates on the database;
creating, by the queue server, a second cropped image from the second portion of the image file, the second cropped image being defined by the second crop coordinate instructions;
communicating, by the web server, the second cropped image to the local computing device; and
displaying the cropped image and the second cropped image within the user interface.

3. The method of claim 2 further comprising the steps of:
receiving, by the web server, an additional crop instruction coordinates from the local computing device, wherein the additional crop instruction coordinates define an additional portion of the image file to be displayed on the local computing device, the additional crop instructions being defined via a user input;
storing, by the web server, the additional crop instruction coordinates on the database;
creating, by the queue server, an additional cropped image from the additional portion of the image file, the additional cropped image being defined by the additional crop coordinate instructions;

communicating, by the web server, the additional cropped image to the local computing device; and displaying the cropped image, the second cropped image, and the additional cropped image within the user interface.

4. The method of claim 1 further comprising the steps of:

receiving, by the web server, an additional crop instruction coordinates from the local computing device, wherein the additional crop instruction coordinates define an additional portion of the image file to be displayed on the local computing device, the additional crop instructions being defined via a user input;

storing, by the web server, the additional crop instruction coordinates on the database;

creating, by the queue server, an additional cropped image from the additional portion of the image file, the additional cropped image being defined by the additional crop coordinate instructions;

communicating, by the web server, the additional cropped image to the local computing device; and displaying the cropped image and the additional cropped image within the user interface.

5. The method of claim 4 further comprising the steps of:

communicating, by the local computing device, a second resource address from the local computing device to the web server;

building, by the capture server, a site page associated with the resource address within the browser instance on the capture server;

converting, by the capture server, the site page to an image file receiving, by the web server, a second crop instruction coordinates from the local computing device, wherein the second crop instruction coordinates define a second portion of the second image file to be displayed on the local computing device, the second crop instructions being defined via a user input;

storing, by the web server, the second crop instruction coordinates on the database;

creating, by the queue server, a second cropped image from the second portion of the image file, the second cropped image being defined by the second crop coordinate instructions;

communicating, by the web server, the second cropped image to the local computing device; and displaying the cropped image, the second cropped image, and the additional cropped image within the user interface.

* * * * *